United States Patent [19]

Christopher et al.

[11] 3,865,190

[45] Feb. 11, 1975

[54] HYDRAULIC FRACTURING METHOD

[75] Inventors: Charles A. Christopher, Houston; Joseph C. Allen, Bellaire, both of Tex.

[73] Assignee: Texaco Inc., New York, N.Y.

[22] Filed: July 9, 1973

[21] Appl. No.: 377,865

[52] U.S. Cl. ............................ 166/308, 252/8.55 R
[51] Int. Cl. ............................................. E21b 43/26
[58] Field of Search ............ 166/308, 280, 283, 281, 166/271, 259; 252/8.55 R

[56] References Cited
UNITED STATES PATENTS

| | | | |
|---|---|---|---|
| 2,965,172 | 12/1960 | Da Roza | 166/308 |
| 3,131,075 | 4/1964 | Brooks, Jr. et al. | 166/293 X |
| 3,378,074 | 4/1968 | Kiel | 166/308 |
| 3,759,326 | 9/1973 | Christopher et al. | 166/274 X |
| 3,780,808 | 12/1973 | Christopher et al. | 166/274 |

*Primary Examiner*—Stephen J. Novosad
*Attorney, Agent, or Firm*—Thomas H. Whaley; C. G. Ries

[57] ABSTRACT

A subterranean fluid containing formation, for example, a hydrocarbon reservoir, may be hydraulically fractured by pumping a novel fluid down a well bore penetrating the formation to contact the formation at sufficient pressure to cause fractures. The novel fracturing fluid comprises a fluid thickened with a particular type of amorphous colloidal silica. The fluid may have an aqueous or hydrocarbon base.

13 Claims, No Drawings

HYDRAULIC FRACTURING METHOD

BACKGROUND OF THE INVENTION

1. Field of the Invention

This invention pertains to the field of hydraulic fracturing of subterranean fluid containing formations.

2. Description of the Prior Art

Hydraulic fracturing is the term used to describe a process whereby a fluid is pumped into a well bore communicating with a subterranean reservoir under high enough pressure to exceed the equilibrium overburden force of the earth and split or crack the rock or mineral comprising the matrix of the subterranean formation. As these pressure forces become great they force the reservoir matrix apart and begin a split or crack which is lengthened by the fluid pumping into the formation through the well.

To be acceptable a fracturing fluid must have several characteristics. Among these characteristics are the following: (1) It must be of low enough viscosity to be easily pumped by surface equipment. (2) It must be viscous enough to hold a propping material such as sand in suspension while being pumped down the well but at the same time it must be capable of depositing the propping material in the cracks created in the formation. (3) It must flow into the cracks or splits created in the formation with a minimum of fluid loss to the pores. (4) It must not plug the pores of the formation permanently or the capacity of the formation to produce fluids will be damaged.

The base fluid of many fracturing fluids is composed of either an aqueous fluid or a hydrocarbon fluid or a mixture of both. Some of these fluids even without the addition of agents thereto possess enough of the desired characteristics to permit their use as fracturing fluids under some conditions. However, it is often the case that these fluids are quite low in viscosity and are unable to maintain the propping material in suspension at normal pump rates. Therefore, very high pump rates are required but are often impossible because of limitations of available equipment. This is particularly so when pumping through tubing or small diameter casing. Such tubing and small diameter casing are found in various kinds of wells as, for example, the permanent completion type well wherein the tubular member is permanently placed within the well with its lower extremity located above the bottom of the well. Thus, most fracturing fluids require the addition of one or more agents to achieve the desired results.

In addition to hold a propping material such as sand in suspension while being pumped down the well the fracturing fluid must also deposit the sand in the fractures in the formation in order to hold these fractures open. In general, the higher the viscosity of the fracturing fluid the better the fluid for purposes of sand suspension. The higher viscosity fracturing fluids tend to hold the sand in suspension as the fracturing fluid is pumped into the well. The reason for holding the sand in suspension is to prevent the sand from settling into the bottom portion of the resulting fracture. Also, a good sand suspension fracture fluid prevents the sand from bridging across the fracture. If bridging of the sand can be avoided or the sand is not settled into the bottom of the fracture a longer fracture is obtainable and a better propping of the fracture will result. It is the object of our invention to provide a fracturing fluid which will have a high enough viscosity to operate effectively. It is also an object of our invention to produce a fluid that behaves as a pseudo plastic material and that its viscosity will decrease with increasing shear rates. This will cause the viscosity to drop somewhat in the visciity of the well bore so that higher injection rates can be obtained. It is also an object of our invention to produce a fluid which is not permanently degraded by extremely high shear rates encountered in hydraulic fracturing processes.

SUMMARY OF THE INVENTION

The invention is a process whereby a novel fluid is pumped down a well bore and into a subterranean fluid containing formation under conditions of pressure that will fracture the subterranean formation. The novel fracturing fluid may have an aqueous base, a hydrocarbon base or a mixture of the two. The fluid contains a thickener comprising amorphous colloidal silica.

DESCRIPTION OF THE PREFERRED EMBODIMENTS

The Fluid

Broadly, the fracturing fluid useful in the process of our invention comprises a fluid thickened with colloidal silica. In one embodiment of our invention the fracturing fluid useful in the process of our invention comprises an intimate mixture of water, a hydrocarbon and colloidal silica. A surfactant and/or a polar multifunctional compound may be added to adjust the viscosity of the fluid.

In another typical embodiment of our invention the fracturing fluid comprises an intimate mixture of water and colloidal silica such that the dispersion of the colloidal silica and the water is stable and not subject to separation into distinct phases.

In yet another typical embodiment of our invention the fracturing fluid comprises an intimate mixture of a hydrocarbon and colloidal silica.

When water is used, it may be fresh or mineral ladened, as for example, salt water obtained from a subterranean formation in the vicinity of oil bearing zones. The water selected should be compatible with the formation that it is to be injected into so that harmful swelling, for instance, will not occur.

If a hydrocarbon is to be used in the fracturing fluid of our invention, it may be any liquid hydrocarbon commonly found in and about an oil field. Examples of suitable hydrocarbons are aromatics such as benzene and toluene and aliphatics such as LPG, propane, butane, isobutane, pentane, isopentane and hexane. Lease crude may be used; also any mixture of suitable and available hydrocarbon are acceptable.

The colloidal silica useful in our invention is different from precipitated silica, silica gel or silica flour. The colloidal silica useful in our invention is a fumed silica, an amorphous material, which is made up of chain-like formations sintered together. These chains are branched and have enormous external surface areas of from about 50 to 400 square meters/gram. Each segment in the chain has many hydroxyl (OH) groups attached to silicon atoms at the surface. When the segments come into proximity to each other these hydroxy groups will bond to each other by hydrogen bonding to form a three dimensional network. Not all silicas in a colloidal size range are useful in our invention. Finely ground sand, a crystalline material, such as silica flour is not useful in our invention.

The colloidal silica acceptable for use in the method of our invention, however, should have a particle size ranging from about 7 to 15 millimicrons (mu). In this colloidal size range the silica will pass through even reservoirs with very small pore size and will therefore not plug the reservoirs. For example, a reservoir having very low permeability of say 0.16 millidarcies (md) has a correspondingly small pore size of 25 to 100 mu. Thus, the colloidal silica suitable for the use in the process of this invention will pass through even the smallest pores encountered in hydrocarbon reservoirs and therefore will not tend to plug the reservoirs when they are returned to production after the fracturing process is completed.

Colloidal silicas are readily available for manufacturers. One source is the Cabot Corp. of Boston, Mass. under the trade name CAB-O-SIL. Colloidal silica is also available from other commercial sources and the reference to one source is not intended to limit the scope of our invention.

When silica particles are dispersed in a liquid medium the network structure formed by the silica particles restricts movement of molecules in liquid medium. This results in an increase in the viscosity of the liquid. The thickening efficiency of the silica is directly related to the polarity of the liquid to be thickened. The use of selected additives (surfactants and/or multifunctional compounds) can increase the thickening efficiency of the silica. In the case of the hydrocarbon mentioned above these additives react with the interface between the silica and the solvent and increase the degree to which the silica particles form the three dimensional network. This allows less silica to be used to achieve equivalent thickening of the solvent. Usually less than 0.5 percent of the additive based on the weight of total liquid to be thickened will achieve marked increases in viscosity.

For liquids of high polarity such as water, aldehydes, ketones, etc., cationic and nonionic surfactants e.g., oleoyl, trimethylene diamine and nonylpolyethoxyethanols can cause dramatic increases in viscosity. Low polarity or nonpolar liquids, such as hydrocarbons, are thickened by the use of anionic surfactants such as sodium linear allylate sulfonate and multifunctional compounds such as ethylene glycol. Depending on the system dramatic changes in viscosity can occur by using two additives such as a nonionic surfactant and a cationic type.

The multifunctional compounds mentioned above fall into the general class of compounds with a plurality of groups available for hydrogen bonding. Examples of such compounds are amine ethylene glycol, glycerin and propylene glycol. The method of preparation of the fracturing fluid of our invention involves blending. The technique described below has been found to form a satisfactory fluid of a specific viscosity. Other techniques may possibly be discovered which will also form a satisfactory fluid. The method used is given to aid in carrying out our invention and is not intended to limit the scope of our invention.

An example of the preparation of a typical fluid of our invention is as follows: (1) Measure out 200 milliliters in hexane into a Waring blender. (2) With blender at low speed add 4 grams colloidal silica. (3) Blend 1 minute at 16,000 revolutions per minute — a soft gel forms. (4) Add with blending 3 milliliters of a nonionic surfactant, 3 milliliters of glycerine and 20 milliliters of water — a firm gel forms. The gel so formed is protected from evaporation of the water and hexane is stable and could be transported to the well site as is. (5) At least 1,000 milliliters more hexane and 210 milliliters of water are added to the firm gel to reduce the viscosity to that to be used as a fracturing fluid.

A material made as outlined above has remained a stable liquid at about 160 centipoise viscosity for a year. The desired viscosity of the fluid is a matter of choice by those skilled in the art. Due to the number of ingredients a detailed explanation of methods of varying viscosity is impracticable. However, it will be evident to one skilled in the art what effect each ingredient has on the viscosity so that an infinite number of fluids may be made which will fall within the scope of the our invention. Other additives may, of course, be necessary and useful in preparing an acceptable fracturing fluid. For example, a filter loss additive may be necessary. Filter loss agents prevent the fracturing fluids from penetrating into the formation thus keeping the fluids into the fracture with its load of proping agents. Thus, less liquid is needed to perform a given fracturing job. Typical filter loss control agents are lime, talc, guargum, hydrocarbon resins and silica flour. Silica flour, as explained above is, of course, crystalline silica or simply finely ground sand as opposed to the amorphous material useful as the thickening agent of our invention.

The propping agents useful in our invention are those useful in any fracturing fluid. For example, sand, walnut shells, glass or any prior art propping agent may be useful.

The Method

An example of this novel method for stimulating low productivity wells follows:

An oil bearing formation composed primarily of limestone (calcium carbonate) having good porosity (about 25 percent) contains a large quantity of oil (about 60 percent of the pore space) and adequate reservoir pressure (about 700 psi) but has a very low permeability (less than 1 millidarcy). It exists at a depth of 1,500 ft. and the productivity is less than 5 bbls. oil per day. The formation is about 100 ft. thick.

The formation is fractured in 6 stages using conventional techniques for proportioning the fracture fluid into each set of perforations. The fracture fluid has the composition described above which provides a viscosity of about 160 cp permitting a sand concentration of 6 lb./gal.

The formation is fractured using this fluid and sand (126,000 lbs. total). The sand size is:

| First 100,000 lb. | 20–40 mesh |
| Remaining 25,000 lb. | 10–12 mesh |

The well is placed on production and produces at a rate of 40–50 barrels of oil per day.

We claim:

1. In a method for increasing the productivity of a subterranean formation penetrated by a well wherein a fracturing fluid is forced down the well to the formation and increasing the pressure on the fracturing fluid in order to rupture the formation rock and thereby create a fracture the improvement which comprises using as the fracturing fluid a thickened composition containing colloidal silica.

2. A method as in claim 1 wherein the fracturing fluid comprises an intimate mixture of water, a hydrocarbon and colloidal silica.

3. A method as in claim 2 wherein the fracturing fluid also contains a surfactant.

4. A method as in claim 2 wherein the fracturing fluid also contains a polar multifunctional compound.

5. A method as in claim 2 wherein the fracturing fluid also contains a surfactant and a polar multifunctional compound.

6. In a method for increasing the productivity of a subterranean formation penetrated by a well wherein a fracturing fluid is forced down the well to the formation and increasing the pressure on the fracturing fluid in order to rupture the formation rock and thereby create a fracture the improvement which comprises using as the fracturing fluid a thickened composition comprising water and colloidal silica.

7. A method as in claim 6 wherein the fracturing fluid also contains a surfactant.

8. A method as in claim 6 wherein the fracturing fluid also contains a polar multifunctional compound.

9. A method as in claim 6 wherein the fluid also contains a surfactant and a polar multifunctional compound.

10. In a method for increasing the productivity of a subterranean formation penetrated by a well wherein a fracturing fluid is forced down the well to the formation and increasing the pressure on the fracturing fluid in order to rupture the formation rock and thereby create a fracture the improvement which comprises using as the fracturing fluid a thickened composition comprising a hydrocarbon and colloidal silica.

11. A method as in claim 9 wherein the fracturing fluid also contains a surfactant.

12. A method as in claim 9 wherein the fracturing fluid also contains a polar multifunctional compound.

13. A method as in claim 9 wherein the fracturing fluid also contains a surfactant and a polar multifunctional compound.

* * * * *